(12) United States Patent
Waterton et al.

(10) Patent No.: US 11,050,815 B2
(45) Date of Patent: Jun. 29, 2021

(54) DYNAMIC RESOURCE PROVISION BASED ON DETECTED NEARBY DEVICES

(71) Applicant: INTERNATIONAL BUSINESS MACHINES CORPORATION, Armonk, NY (US)

(72) Inventors: Thomas James Waterton, Southampton (GB); Caroline J. Thomas, Eastleigh (GB); James Hewitt, Eastleigh (GB); Richard Jacks, Fareham (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/697,703

(22) Filed: Nov. 27, 2019

(65) Prior Publication Data

US 2021/0160306 A1 May 27, 2021

(51) Int. Cl.
*H04L 29/08* (2006.01)
*G06Q 10/10* (2012.01)
*H04N 7/14* (2006.01)
*H04L 12/58* (2006.01)

(52) U.S. Cl.
CPC ......... *H04L 67/10* (2013.01); *G06Q 10/1095* (2013.01); *H04L 51/28* (2013.01); *H04L 67/18* (2013.01); *H04L 67/306* (2013.01); *H04N 7/147* (2013.01)

(58) Field of Classification Search
CPC ......... H04L 67/10; H04L 51/28; H04L 67/18; H04L 67/306; G06Q 10/1095; H04N 7/147
USPC ......................................................... 709/226
See application file for complete search history.

(56) References Cited

U.S. PATENT DOCUMENTS

| 9,055,020 B2 | 6/2015 | Miettinen |
| 2013/0144603 A1* | 6/2013 | Lord ................. H04N 5/44543 704/9 |
| 2015/0134742 A1* | 5/2015 | Ikeda ................. H04L 65/1069 709/204 |
| 2019/0173745 A1 | 6/2019 | Rjeili |

OTHER PUBLICATIONS

Apple, "Use Siri Shortcuts", [accessed on Oct. 30, 2019], 3 pages, Retrieved from the Internet: <URL: https://support.apple.com/en-us/HT209055>.

(Continued)

*Primary Examiner* — Nicholas R Taylor
*Assistant Examiner* — Chong G Kim
(74) *Attorney, Agent, or Firm* — Steven M. Bouknight

(57) ABSTRACT

A method for provisioning resources to a user during a meeting with another user, each user having an associated computing device is provided. The method may include detecting a meeting of a first user with a second user, each of the first and second users having an associated computing device. The method may further include obtaining historical data relating to previous activity of at least one of the first and second users during one or more earlier meetings between the first and second users. The method may further include provisioning one or more resources to at least one of the first and second users based on the obtained historical data associated with the one or more earlier meetings.

17 Claims, 9 Drawing Sheets

(56) References Cited

OTHER PUBLICATIONS

Google, "Nearby Connections API", Google Developers, [accessed on Oct. 3, 2019], 4 pages, Retrieved from the Internet: <URL: https://developers.google.com/nearby/connections/overview>.
Mell et al., "The NIST Definition of Cloud Computing", National Institute of Standards and Technology, Special Publication 800-145, Sep. 2011, 7 pages.
Samat, "Android 9 Pie: Powered by AI for a smarter, simpler experience that adapts to you", Google, Aug. 6, 2018 [accessed on Oct. 30, 2019], 8 pages, Retrieved from the Internet <URL: https://www.blog.google/products/android/introducing-android-9-pie/>.
The Cheese Factory, "Google's Awareness API in action. Make your application be User's Context-Aware", Jun. 29, 2016 [accessed on Oct. 30, 2019], 28 pages, Retrieved from the Internet <URL: https://inthecheesefactory.com/blog/google-awareness-api-in-action/en>.

\* cited by examiner

| Time | Change | Source | "Nearby" |
|---|---|---|---|
| 09:04 | Saw Bluetooth device 1 | Bluetooth monitoring | Bluetooth 1 |
| 09:06 | Saw Bluetooth device 2 | Bluetooth monitoring | Bluetooth 1<br>Bluetooth 2 |
| 09:20 | Bluetooth device out of range | | Bluetooth 2 |
| 09:30 | Met with Barry and Christine | Calendar | Bluetooth 2<br>Barry<br>Christine |
| 09:31 | Saw Bluetooth device 3 | Bluetooth monitoring | Bluetooth 2<br>Barry<br>Christine<br>Bluetooth 3 |
| 09:35 | Saw Zigbee device 1 | Zigbee monitoring | Bluetooth 2<br>Barry<br>Christine<br>Bluetooth 3<br>Zigbee 1 |
| 10:00 | Meeting ended | Calendar | Bluetooth 2<br>Bluetooth 3<br>David |
| 10:02 | Zigbee device 1 out of range | Zigbee monitoring | Bluetooth 2<br>Bluetooth 3 |
| 10:03 | Bluetooth device 3 out of range | Bluetooth monitoring | Bluetooth 2 |

| Time  | Event              | Source                        |
|-------|--------------------|-------------------------------|
| 09:10 | Opened email       | Browser                       |
| 09:15 | Opened notes       | Operating System              |
| 09:33 | Opened file note A | Browser                       |
| 09:38 | Opened spreadsheet B | Operating System / Office Suite |

FIG. 6

DYNAMIC RESOURCE PROVISION BASED ON DETECTED NEARBY DEVICES

BACKGROUND

The present invention generally relates to the field of computing, and more specifically, to controlling the provision of resources to a user during a meeting with another user, with each user having an associated computing device.

Generally, when people meet to collaborate or work together, they often need to use the same (or related) electronic resource. For example, team meetings to review a project status may use the same online dashboard during each meeting. In another example, a workgroup might always use a collaborative online data storage folder each time members of the workgroup meet. Typically, each time such groups of people meet, each individual must manually locate and access (i.e. open, execute or load) the relevant resource(s).

SUMMARY

According to one aspect of the invention, there is provided a computer-implemented method for provisioning resources to a user during a meeting with another user, each user having an associated computing device. The method comprises detecting a meeting of first and second users, each of the first and second users having an associated computing device. The method also comprises obtaining historical data relating to previous activity of at least one of the first and second users during one or more earlier meetings between the first and second users. The method further comprises provisioning a resource by at least one of the first and second computing devices based on the obtained historical data relating to the previous activity of at least one of the first and second users.

According to another aspect of the invention, there is provided a computer program product. The computer program product comprises a computer readable storage medium having program instructions embodied therewith, the program instructions executable by a processing unit to cause the processing unit to perform a method according to a proposed embodiment. The method comprises detecting a meeting of first and second users, each of the first and second users having an associated computing device. The method also comprises obtaining historical data relating to previous activity of at least one of the first and second users during one or more earlier meetings between the first and second users. The method further comprises provisioning a resource by at least one of the first and second computing devices based on the obtained historical data relating to the previous activity of at least one of the first and second users.

According to yet another aspect of the invention, there is provided a system comprising one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method for controlling the provision of resources to a user during a meeting with another user, with each user having an associated computing device. The system comprises a detection component configured to detect a meeting of a first user with a second user, each of the first and second users having an associated computing device. The system also comprises an interface component configured to obtain historical data relating to previous activity of at least one of the first and second users during one or more earlier meetings between the first and second users. The system further comprises a controller for provisioning a resource by at least one of the first and second computing devices based on the obtained historical data relating to the previous activity of at least one of the first and second users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 illustrates an exemplary diagram illustrating a record of laptop usage and location data for a device associated with a user as it relates to data including the location and/or proximity of other devices that may be associated with other users according one embodiment;

FIG. 6 illustrates a record of key events that occur and that are associated with a user device based on FIG. 5;

DETAILED DESCRIPTION

Figure 1:
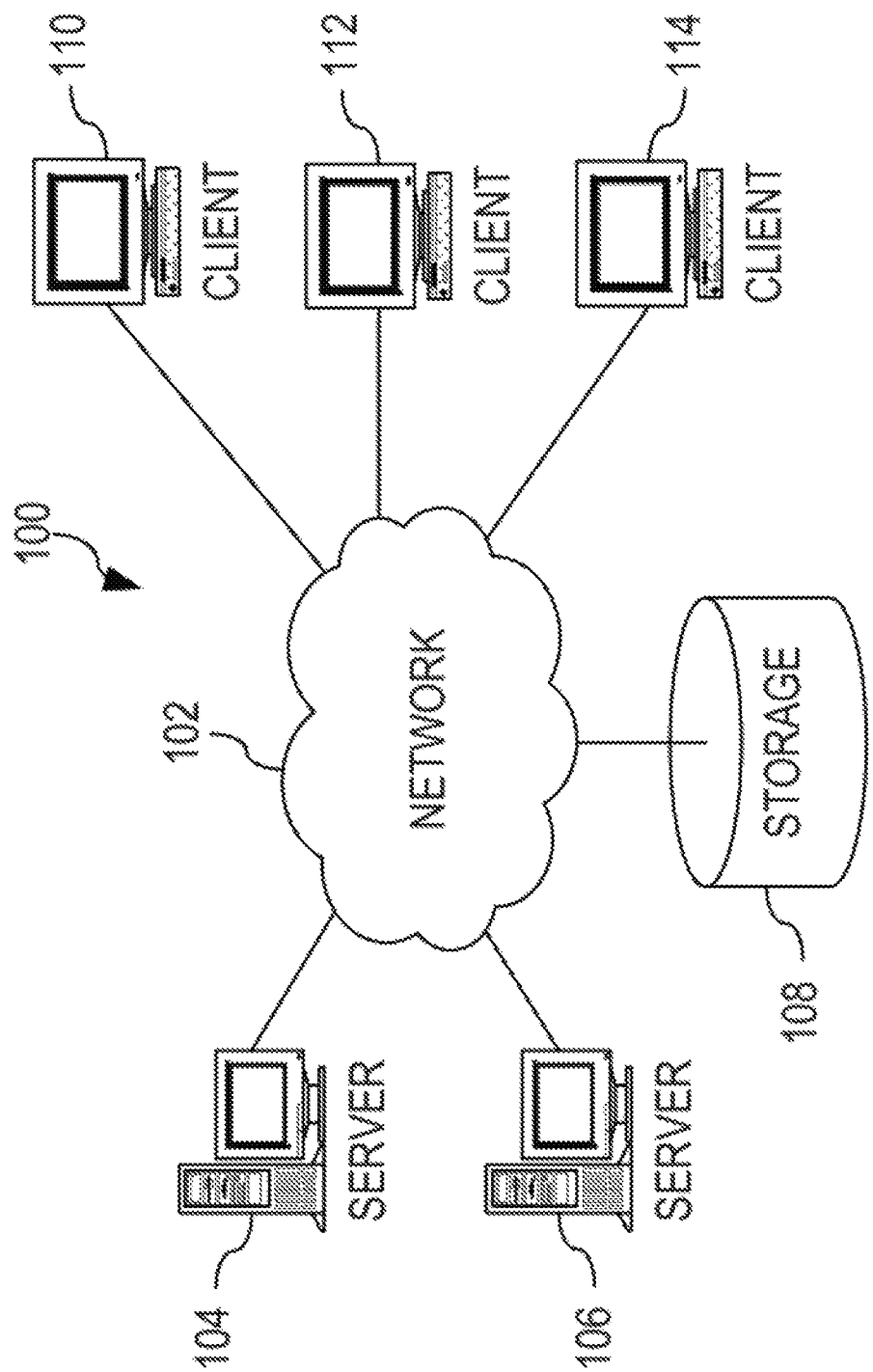
FIG. 1 depicts a distributed system in which aspects of the illustrative embodiments may be implemented.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

For example, in the context of the present invention, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

Reference to a resource should be taken to refer to an electronic or digital resource that is used or made available by a computing device. Thus, purely by way of example, a resource may comprise: a notification; an application; an audio file; an address of a resource; or an electronic data file.

Reference to a meeting should be taken to a coming together (either in person or via a communication link, such as the internet, video link, audio call, etc.) of people to work, collaborate, socialize or discuss. A meeting may therefore take place with people in the same location and/or with some participants in different locations. For example, a meeting of a first user with a second user may take place within a room, wherein both the first and second users are in the same room. In another meeting between first and second users, the first user may be located in a first room and a second user may be located in a second room, the second room being in another building (which may be remotely located from the building comprising the first room). Such a meeting may therefore take place via a video/audio communication link.

Proposed is a method, computer system, and computer program product for controlling the provision of a resource to the user of a computing device based on earlier meetings, where the provision of a resource to the user of a computing device is based on one or more computing devices that are used by another user participating (or present) in the meeting. Dynamic context and action prompts based on people and devices of a meeting may thus be provided to a user of a computing device. Furthermore, nearby devices may be detected in order to identify people of a meeting.

According to one embodiment, the present invention may provide resources (such as electronic files, applications, notifications and/or action prompts) to a first user in response to identifying the presence of one or more other users in a nearby surrounding area of the meeting (i.e. in the vicinity of the first user and/or the meeting facilities). Determination of the resources to provide may be based on historical usage information that has been obtained for similar situations. For example, one embodiment may include controlling a user's computing device to automatically open an application and/or providing a notification when near certain devices associated with other users. Determination of which applications/notifications to provide may be based on previous/tracked activities when the same devices have been in proximity with each other. In this way, previously tracked activities may be used to decide which resources to provide when particular devices are near each other.

Embodiments may leverage contextual information relating to a meeting's nearby devices and users in order to control the provision of a resource to a user of a computing device. Enhanced user experience may thus be provided via dynamic and automatic provision of a resource which prevents a user from needing to manually locate and/or access the resource (which may otherwise be frustrating and/or time-consuming).

According to one embodiment, the present invention may be applied across a user's computing devices and computer activity, for example, covering his/her use of a laptop computer, a tablet, a smartphone (i.e. mobile phone), and smartwatch. Benefits may thus be provided to a user in all sorts of contexts, for example, when with work colleagues and when with family members. For instance, when a user opens a photo application at home with family members nearby, an embodiment may control the provision of photos relating to a topic, location and/or dates that have been previously accessed when near the same family members.

According to one embodiment, the present invention may automatically provision a resource via a first user's computing device when it is near a second device associated with a second user. This automated provision of a resource may be based on historical data relating to previous activity of the first and/or second user during earlier meetings between the first and second users. For instance, the historical data may be analyzed to determine which applications are routinely used during meetings between the first and second users. In undertaking such analysis, embodiments may only focus on checking particular activities, such as application usage or accessed files for example. This may reduce time and/or computational costs associated with completing the analysis.

Embodiments may therefore provide for automatic provision of electronic resources to a user during a meeting with another user based on previous user behavior during earlier meetings of the users.

The provision of an electronic resource based on devices located within an area around a first computing device and historical data relating to previous activity during earlier meetings of the devices may assist in efficient use of the devices, thereby enabling faster and more effective use of resources during a meeting. For example, an embodiment may identify when a user of the first computing device is commuting based on identifying new and unknown nearby devices at a specified time of the day. Historical data relating to previous activity in similar circumstances may be used to determine what resource (e.g. music application, browser or email application) may be desired by the user during such a commute. In some embodiments, the system for controlling the provision of a resource to a user may also be a portable computing device (e.g. a smartphone, a smartwatch, a tablet computer or like), or integrated therein.

Also, according to one embodiment, the present invention may identify computing devices held or carried by other users that are within a given distance range of a first computing device. In some embodiments, detecting and identifying a nearby computing device (i.e. a device in the vicinity of the first computing device) may comprise: determining the location of one or more devices based on a respective GPS sensor incorporated in each of said devices and communicating their location via a telecommunication network or the cloud. In other embodiments, detecting and identifying a nearby computing device may comprise connecting locally with a computing device via a short-range (e.g. 1 m-100 m) wireless connectivity network such as Wi-Fi, Bluetooth or Zigbee. Furthermore, a notification could be presented to the user so that she/he may see a list of other nearby devices and select which ones she/he would like to include or exclude from the set of monitored devices. Embodiments, may also incorporate a concept of automatically assigning a score to all devices detected, based on how many times the user's device is in the same vicinity as another device. Such a concept may leverage the idea that a device the user is often around is more likely to be a known colleague or associate (and therefore the user is more likely to want their interactions incorporated in this invention's logic), whereas a device never seen previously might suggest it is a stranger that the user is not interested in paying attention to.

By way of example, the vicinity of a device may comprise an area surrounding the device having a boundary defined by a range of a communication link (such as a short-to-medium-range communication link) used by the second device to detect the presence of another computing device. For the avoidance of doubt, short-to-medium-range communication link should be taken to mean a short-range or medium-range communication link having a range of up to around 100 meters. In short-range communication links designed for very short communication distances, signals typically travel from a few centimeters to several meters, whereas, in medium-range communication links designed for short to medium communication distances, signals typically travel up to 100 meters. Examples of short-range wireless communication links are ANT+, Bluetooth, Bluetooth low energy, IEEE 802.15.4, ISA 100a, Infrared (IrDA), ISM Band, Near Field Communication (NFC), RFID, 6LoWPAN, UWB, Wireless HART, Wireless HD, Wireless USB, ZigBee. Examples of medium-range communication links include Wi-Fi, Z-Wave. Reference to the vicinity of a device may thus be taken to refer to an area surrounding the device and having a boundary that is a few centimeters to several meters from the device (e.g. within 100 m, preferably within 50 m, more preferably within 25 m, even more preferably within 10 m, and yet more preferably within 5 m).

Also, the range of the area around the device used for locating nearby computing devices may be adjusted dynamically to increase or decrease the number of possible nearby devices with users.

The computing devices may be portable computing devices. An example of a portable computing device is a head-mountable computing device, which comprises a device that can be worn of the head of its user and provides the user with computing functionality. Non-limiting examples of such head-mountable computing devices include smart headgear, e.g. eyeglasses, goggles, a helmet, a hat, a visor, a headband, or any other device that can be supported on or from the wearer's head, and so on. Another example of a portable computing device is a smart watch, which is a device that can be worn on the wrist of it user and provide the user with computing functionality (in addition to the normal time-keeping functionality of a watch or timepiece). Further examples of portable computing devices include mobile phones, tablet computers, personal digital assistants, and laptop personal computers. The portable computing device may be configured to perform specific computing tasks as specified in a software application (app) that may be retrieved from the Internet or another computer-readable medium.

Embodiments may be arranged to use existing sensor components, processing capabilities, data storage, and/or communication capabilities of one or more computing devices, to build a ubiquitous network of devices from scratch and, in this manner, control the provision of resources to each of the devices based on historical user behavior during previous meetings.

Embodiments may therefore utilize the insight that people attending a meeting may carry computing devices that may be detected and identifiable, such that useful information about previous activities of the people in the meeting can be used to determine which resource(s) may be likely to be used in a current meeting (and thus useful to automatically provide).

Embodiments may be a modular system wherein the computing devices are separate modules, e.g. separate devices in communication with each other, e.g. via wireless communication, and a module is provided to undertake all or part of a proposed method in order to generate control signal for either of the computing devices. For example, each of the computing devices may comprise a smart phone, tablet, head-mountable computing device or smart watch.

Embodiments may further comprise a database of historical data relating to previous activities of users during earlier meetings, and this may be integrated in one or more of the computing devices and/or remotely accessible via a communication network for example or via a distributed processing environment (such as the 'cloud' for example).

Some embodiments may further comprise: detecting an activity of at least one of the first and second users in response to the provision of the resource; and updating the historical data based on the detected activity. In this way, the historical data may be updated to and refined for future use, thereby improving the accuracy of subsequent determinations for example.

Historical data relating to a user may comprise information representing at least one of: an event occurrence, a source device, an executed application, an accessed data file, a location of the user, nearby users, a deployed communication link, an accessed resource address, a scheduled meeting, and invited users. Various actions or activities that are undertaken during previous meetings of the computing devices may thus be used as a context for determining which resource(s) may be useful to provide. Thus, the historical data may be representative of one or more aspects of previous/earlier user behavior during meetings of the computing devices. Such information may be easily obtainable (e.g. automatically recorded) as a result of conventional usage of the computing devices.

Embodiments may further comprise: communicating the control signal to at least one of the first and second computing devices; and controlling the at least one of the first and second devices to which the control signal was communicated based on the control signal so as to provide a resource to the first and/or second user. In this way, at least one of the computing devices may be remotely controlled by the provision a control signal from another device. For instance, an embodiment may employ a set-top box or service device which is configured to generate a control signal for the second computing device. Embodiments may thus be implemented to control the provision of resources via a conventional computing device, thereby enabling a system to be provided separately from the computing device(s), e.g. in a location such as a meeting/conference room.

Each of the computing devices may comprise at least one of: a smartphone; a smartwatch; a tablet computer; a laptop computer; and a desktop computer. Embodiments may therefore be employed in conjunction with a wide range of computing devices that are typically carried and used by people, and such embodiments may even leverage the capabilities of the computing devices to perform all or part of the proposed concepts.

Obtaining historical data may comprise: accessing a database of historical data; and extracting historical data for both of the first and second users associated with one or more earlier meetings between the first and second users. In this way, historical data may be stored and provided separately (e.g. in a remote database server). This may provide for improved security of the historical data and/or alleviate local data storage requirements that would otherwise be placed on one or more parts of an embodiment.

Each of the computing devices may comprise a communication interface arranged to communicate information via an associated communication link. Embodiments may then further comprise communicating the control signal to at least one of the computing devices via its associated communication link. For instance, a proposed concept for generating a control signal may be implemented in the second computing device, and the second computing device may then communicate a control signal to the first computing device. In this way, the provision of resources across multiple devices may be controlled during a meeting in which the devices are present.

When compared to conventional approaches, proposed embodiments may provide one or more of the following advantages: (i) device usability enhancement; (ii) additional artificial intelligence enhancements to existing offerings. Such advantages may be provided by the proposed concept of using previous user behavior during a meeting of people (e.g. which resources were previously accessed) to control the provision of resources in a (current) meeting of the same people.

FIG. 1 depicts an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
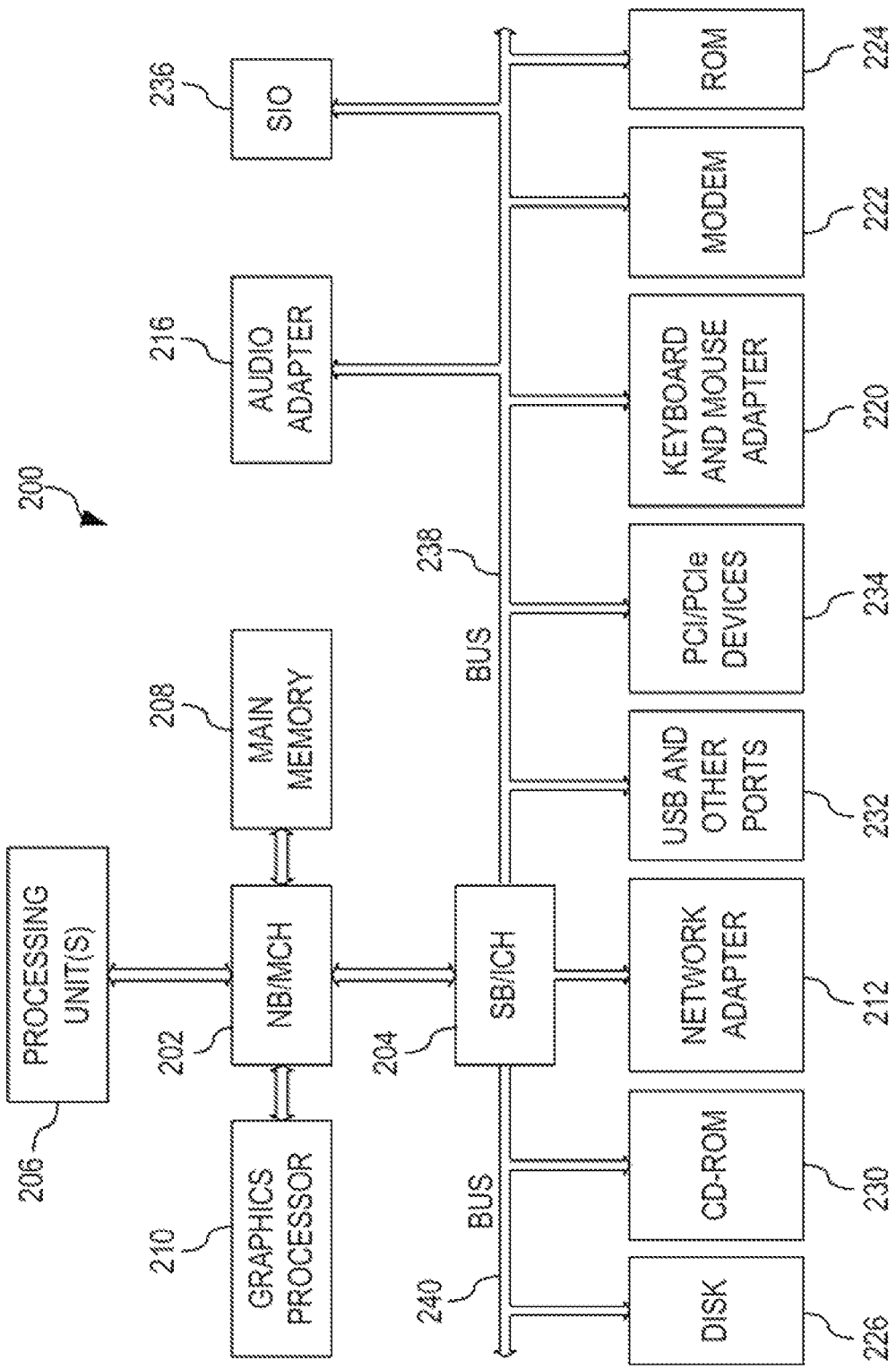
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments may provide a method and system for controlling the provision of resources to a user during a meeting with another user, each user having an associated computing device. In such embodiments, a control signal may be generated based on historical data relating to previous activity of at least one of users during one or more earlier meetings between users.

Figure 3:
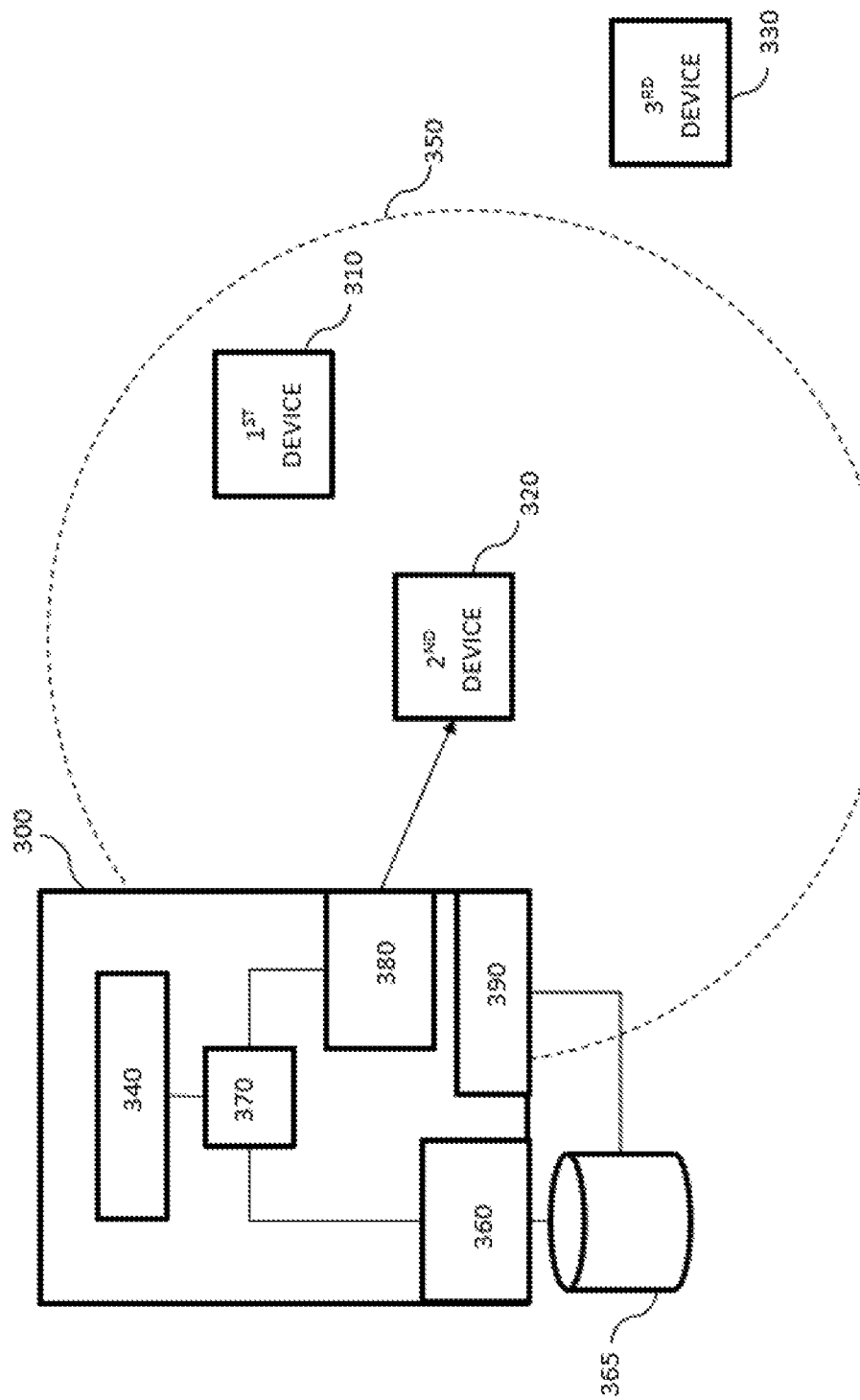
FIG. 3 is a simplified block diagram of a proposed system according to an embodiment of the present invention.

Referring to FIG. 3, there is depicted a schematic diagram of proposed system according to an embodiment. The system 300 is configured to control the provision of resources to a user during a meeting with another user. Each user has an associated computing device. More specifically, in this example: a first computing device 310 (such as a laptop computer) is associated with a first user; a second device 320 (such as a smartphone) is associated with a second user; and a third computing device 330 (such as a tablet computer) is associated with a third user.

A detection component 340 of the system is configured to detect a meeting of a first user with a second user by detecting the presence of a computing device associated with a user within the vicinity of the second device 320. Here, the vicinity of the second computing device 320 comprises an area 350 surrounding the second device having a boundary (depicted by a dashed line in FIG. 3) that is defined by a predetermined range. More specifically, in the example of FIG. 3, the detection component 340 is configured to detect the presence of a computing device associated with a user within approximately 5 m of the second computing device 320. Purely by way of example, detection component 340 may achieve this by monitoring (e.g. using conventional LiDAR, IR monitoring, video processing, radar or EM signal monitoring techniques or the like) the position of the second computing device 320 relative to the position of other computing devices (such as the first 310 and third 330 devices).

In the example depicted in FIG. 3, the detection component 340 detects the presence of the first computing device 310 within the boundary of the area 350 surrounding the second device 320 (i.e. within the vicinity of the second device). The detection component 340 also detects that the third computing device 330 is not within the boundary of the area 350 surrounding the second device 320.

An interface component 360 of the system 330 is configured to obtain historical data relating to previous activity of the first and second users (i.e. the users associated with the first 310 and second devices 320) during one or more earlier meetings between the first and second users. Here, the interface component 360 is configured to access a remotely located database 365 of historical data (e.g. a cloud-based data storage unit) and to extract historical data for both of the first and second users associated with one or more earlier meetings between the first and second users. By way of illustration, historical data relating to a user in this example comprises information representing at least one of: an event occurrence; a source device; an executed application; an accessed electronic data file; a location of the user; nearby users; a deployed communication link; an accessed resource address; a scheduled meeting; and invited users.

A controller 370 (e.g. microprocessor) of the system 300 is configured to generate a control signal based on the obtained historical data. The generated control signal is configured to control the provision of a resource by the second computing device 320. By way of illustration only, a resource in this example may comprise at least one of: a notification; an application; an audio file; an address; and a data file.

A communication component 380 of the system 300 is configured to communicate the generated control signal to second computing device 320. The control signal may then be used by the second computing device 320 to control the provision of a resource to the second user (e.g. provide a notification, display a prompt, open an application, etc.).

The system 300 of FIG. 3 also comprises a monitor component 390 that is configured to detect an activity of the second user in response to the provision of the resource by the second computing device 320. Based on detected activity of the second user, the monitor component updates the historical data stored in the database 365. Thus, the system 300 of FIG. 3 is configured to build a database of historical data relating to the activities of users during meetings. Such historical data can then be used in subsequent/later determinations for controlling the provision of resources according to proposed concepts.

From the above description of the embodiment of FIG. 3, it will be appreciated that the exemplary embodiment provides a system 300 that is separate from the computing devices 310, 320, 330. For instance, the system 300 of FIG. 3 may be provided as standalone, desktop device that is positioned in or around a location that is generally used by people for meetings, e.g. in a conference or meeting room. In this way, the system 300 may be used to automatically and dynamically control the provision of resources to a user of the second device 330 during a meeting with another user, and this may be done in consideration of the historical activities of the users in their previous meetings.

In alternative embodiments, the system 300 may be incorporated or integrated into a computing device, such as the second computing device. Thus, an improved computing device may be provided which is adapted to automatically control provision of resources to its user during a meeting with another user.

Figure 4:
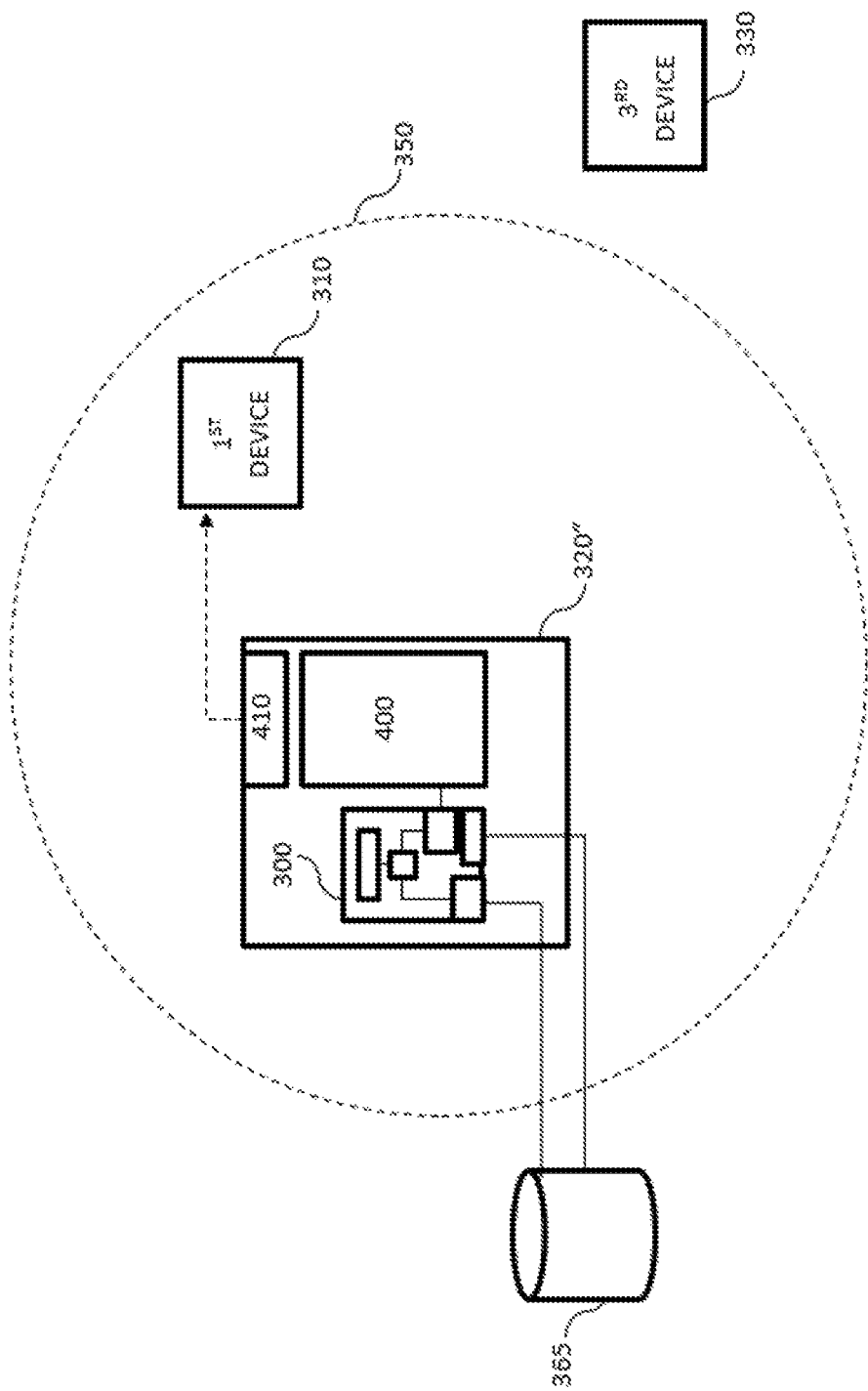
FIG. 4 shows a modification to the proposed system according to an embodiment of the present invention illustrated in FIG. 3.

By way of illustration, FIG. 4 shows a modification to the embodiment of FIG. 3. In the embodiment of FIG. 3, the second computing device 320" comprises the system 300 for controlling the provision of resources to a user from FIG. 3. In other words, the system 300 from FIG. 3 is integrated into the second computing device 320".

As with the embodiment of FIG. 3 described above, the system 300 in the second computing device 320" of FIG. 4 is configured to generate a control signal based on obtained historical data relating to activity of the first and second users (i.e. the users associated with the first 310 and second devices 320) during one or more earlier meetings between the first and second users. The control signal is then used to control the provision of a resource via an output interface (e.g. display) 400 of the second computing device 320".

It is also noted that, in the example of FIG. 4, the second computing device 320 comprises a communication interface 410 that is arranged to communicate information via an associated communication link to the first computing device 310. The second computing device 320" employs the communication interface 410 to communicate the control signal to the first computing device 310, so as to control the provision of a resource to the first user via the first computing device 310. In doing so, the second computing device 320" may (or may not) alter the control signal communicated to the first computing device 310, so as to adapt/modify the resource that is provided to the first user.

By way of additional explanation, embodiments may be configured to monitor which users are nearby to a primary user by detecting and monitoring the presence of computing devices associated with other users (e.g. using Bluetooth or other identifiable wireless signals, or other co-location methods, etc.). A record of all user actions performed (e.g. websites visited, applications opened, files accessed, etc.) while the users are nearby may also be maintained. To facilitate this, the present invention may be integrated into the operating system and/or applications of computing devices.

Therefore, when a new computing device is detected nearby to the primary user, a database of historical actions may be analyzed to identify when the user associated with the new computing device was last nearby and what actions were undertaken during the previous meeting(s). The method, computer system, and computer program product may then automatically undertake one or more of the actions (e.g. open resources on the primary user's device) or provide prompts to the primary user asking if he/she wants to undertake particular actions (e.g. "Do you want to open folder XYZ"? or "Do you want to open the spreadsheet file ABC?", etc.). The primary user's decision at this point may provide further data which may be leveraged to inform a behavior pattern analysis model and therefore influence future decisions for embodiments.

By way of further illustration, consider an example wherein a user, Tom, works with a large and varied team of people on different projects and initiatives and collaborates digitally using mainly email and a shared only storage folder. Every day, Tom has a mixture of engagements and meetings with different team members to progress their work. Every time he meets with someone or a group of people to continue a thread of work, he needs to find the relevant digital content for that thread. Conventionally, Tom would do this by manually remembering where work materials are stored. However, according to one embodiment, when Tom enters a meeting room containing a set of previously seen devices, usually associated with people (e.g. phones, laptops, etc.), Tom's computing device could identify the electronic content for that group of people (file notes, email discussions, etc.) and suggest the electronic content to him.

By way of yet further illustration, an exemplary implementation according to an embodiment may be summarized as follows: 1) As a user goes about his/her normal business, two aspects are recorded and stored in a data store (with date and time stamps), namely: (a) who the user was physically with or deemed to be in contact with (e.g. established from data from Bluetooth, calendar appointment info, phone call/video conferencing data, etc.); and (b) which resources the user accessed (e.g. a particular folder within an online collaboration tool, a particular code repository, a particular dashboard, a particular resource address, a particular set of documents, photos, etc.), as discovered through conventional computing device applications and/or configuration components; 2) When the set of devices nearby to the user changes, it is checked to see if there is a particular action to suggest or undertake based on historical usage patterns. By way of example, thresholds may be employed to determine if an action is associated with the set or nearby devices. For instance, an embodiment may refer to a list of previous actions for the preceding three months and calculate the percentage match for each action to see how many of the same devices were present. The list may be sorted by the percentage match and, by way of example, if the same action appears more than 3 times in the top 10 actions, consider that action to be "appropriate to suggest"; and 3) If there is an appropriate action to suggest, suggest performing that action to the user. This could be via a push notification, modal dialog, or by altering the prominence of selections in the browser (e.g. reordered history selection), the open file dialog (e.g. suggested files appearing higher in the list, etc.), or list of suggested applications, etc.

Referring now to FIG. 5, for example, an exemplary diagram 500 illustrating a record of laptop usage and location data for a device associated with a user as it relates to data including the location and/or proximity of other devices that may be associated with other users is depicted. Specifically, for example, considering a primary user named Abi that uses her laptop throughout the course of a day, laptop usage and location data may be recorded and may include the time of usage, changes to a set of devices or set of other users nearby the user, the source that indicates the change, and an indication of what devices and/or connections are nearby (i.e. who she is with or what devices she is nearby).

Also, during the course of the day (i.e. at the same time), and as illustrated in the exemplary diagram 600 of laptop records in FIG. 6, the laptop may record key events that occur (e.g. actions that Abi undertakes using the laptop) with the time and the source of the key event. As a result, the laptop generates the time series of activity data illustrated in FIG. 6.

For instance, an algorithm according to a proposed embodiment would first take the current list of nearby people and devices (e.g. Barry, David, Bluetooth 3) and search the previous time periods for closest matches. In this example, it could suggest 09:31-09:35 as 2 of the 3 nearby people are there. It could also suggest 09:35-10:00 as all of the nearby people are there. With more data, an appropriate (e.g. 75% of people or similar) threshold could be employed. Then, the method, computer system, and computer program product may analyze the identified time periods to determine what actions/activities were undertaken. In this example, Abi opened file note A and spreadsheet B.

With more data, more meetings with the same people may over time add more certainty. For example, in the scenario whereby file note A was opened in 4 other matching time segments in the past, and Spreadsheet B was opened in 7 other matching time segments in the past, the method, computer system, and computer program product may sort the results by number and determine the most common actions/activities. For example, it may be determined that spreadsheet B was very common with that set of people, and that File note A may also be determined to be commonly used with this set of people. The method, computer system, and computer program product may also suggest the top (x) results to the user, for example via a notification system built into the operating system of the laptop. For this, a threshold could be used, e.g. must be opened at least twice, or at least x times in the last x days/weeks, etc.

From the above description, it will be appreciated that a benefit provided to the primary user is that as he/she moved from one context to another (e.g. from one regular meeting with one set of people to another regular meeting on a different topic with a different set of people), his/her associated computing device (e.g. laptop, phone, etc.) will helpfully suggest applications, actions, etc. that he/she is likely to want to use in those contexts, and this may be based on previous behavior in earlier meetings with the same people.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
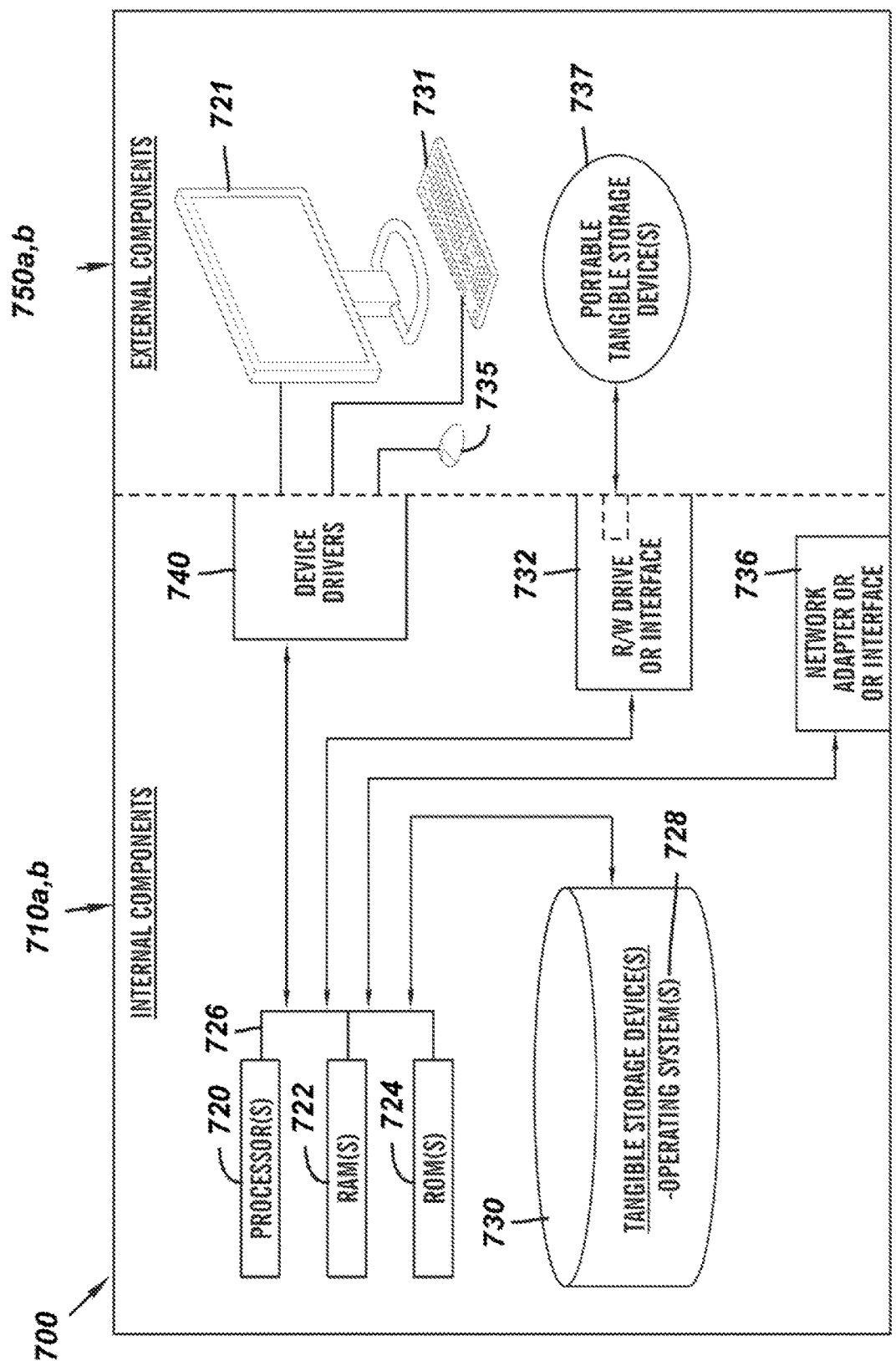
FIG. 7 is a block diagram of the system architecture of the program for automatically detecting and concealing content associated with an incoming notification in response to receiving and presenting the incoming notification on a computing device according to one embodiment.

FIG. 7 is a block diagram 700 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements. Data processing system 710, 750 is representative of any electronic device capable of executing machine-readable program instructions. Data processing system 710, 750 may be representative of a smart phone, a computer system, PDA, or other electronic devices.

Examples of computing systems, environments, and/or configurations that may represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computers 110, 112, 114 (FIG. 1), and network server 104, 106 (FIG. 1) include respective sets of internal components 710 *a, b* and external components 750 *a, b* illustrated in FIG. 7. Each of the sets of internal components 710 *a, b* includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728 and software programs in client computers 110, 112, 114 (FIG. 1) and in network server computers 104 and 106 are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 *a, b*, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program for executing the method, computer system and computer program product, can be stored on one or more of the respective portable computer-readable tangible storage devices 737, read via the respective R/W drive or interface 732, and loaded into the respective hard drive 730. Each set of internal components 710 *a, b* also includes network adapters or interfaces 736 such as a TCP/IP adapter cards, wireless Wi-Fi interface cards, or 3G or 4G wireless interface cards or other wired or wireless communication links. The software programs associated with the method, computer system, and computer program product in client computers 110, 112, 114 (FIG. 1) and in network server computers 104, 106 can be downloaded to client computer 102 (FIG. 1) from an external computer via a network (for example, the Internet, a local area network or other, wide area network) and respective network adapters or interfaces 736. From the network adapters or interfaces 736, the software programs in client computers 110, 112, 114 (FIG. 1) and in network server computers 104, 106 are loaded into the respective hard drive 730. The network may comprise copper wires, optical fibers, wireless transmission, routers, firewalls, switches, gateway computers, and/or edge servers.

Each of the sets of external components 750 *a, b* can include a computer display monitor 721, a keyboard 731, and a computer mouse 735. External components 750 *a, b* can also include touch screens, virtual keyboards, touch pads, pointing devices, and other human interface devices. Each of the sets of internal components 710 *a, b* also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
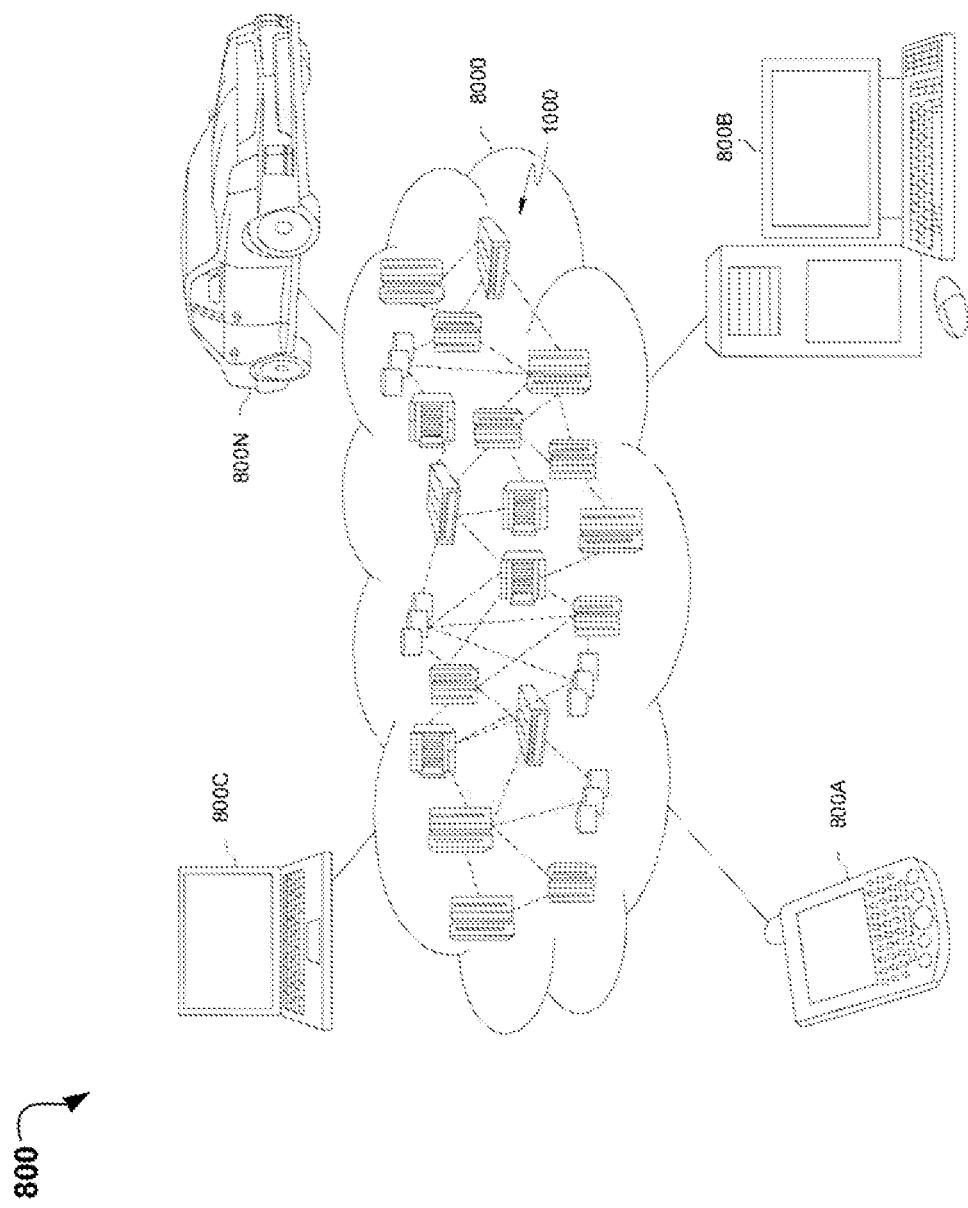
FIG. 8 is a block diagram of an illustrative cloud computing environment including the computer system depicted in FIG. 1, in accordance with an embodiment of the present disclosure.

Referring now to FIG. 8, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 8 are intended to be illustrative only and that computing nodes 100 and cloud computing environment 8000 can communicate with any type of computerized device over any type of network and/or network addressable connection (e.g., using a web browser).

Figure 9:
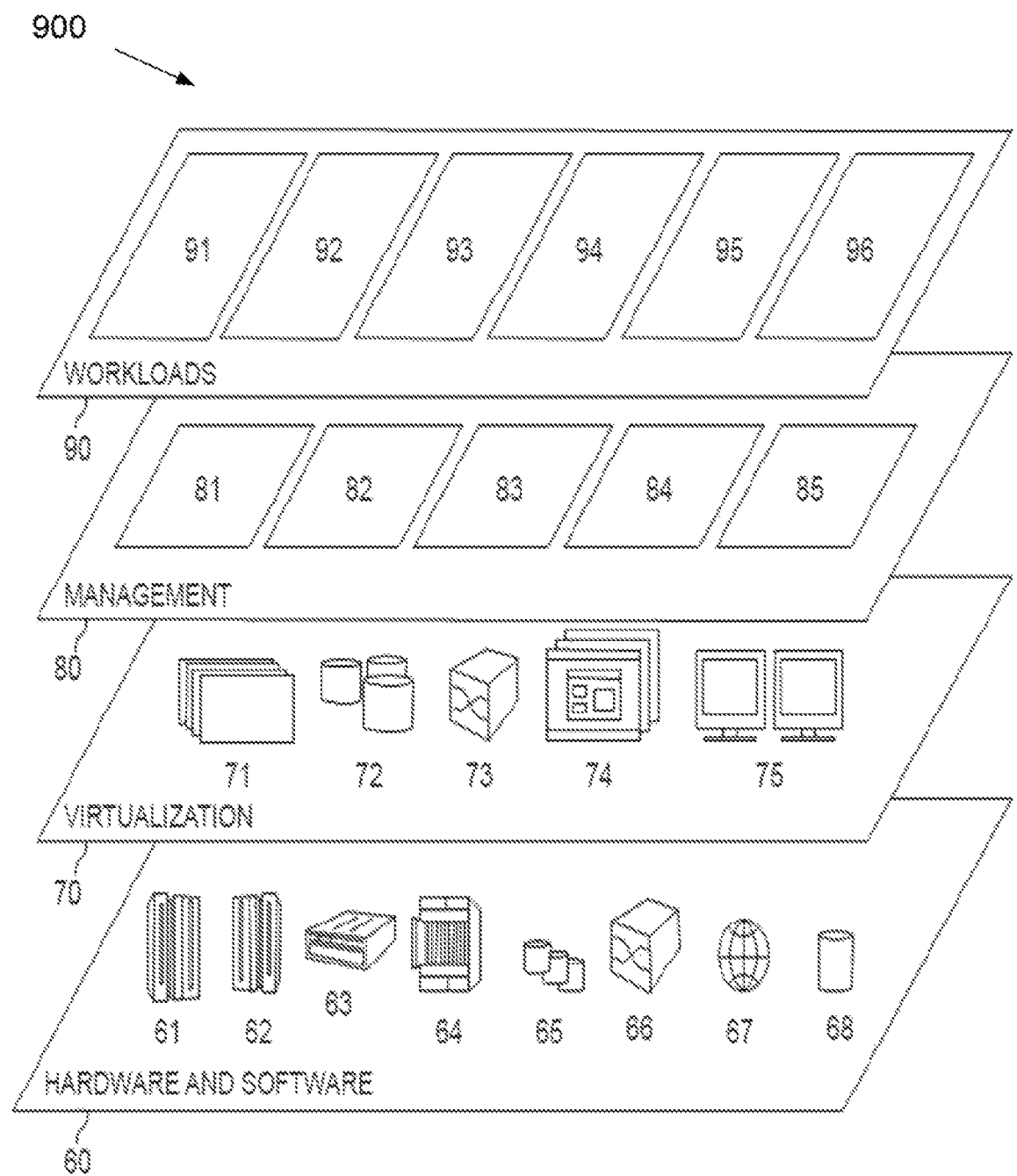
FIG. 9 is a block diagram of functional layers of the illustrative cloud computing environment of FIG. 8, in accordance with an embodiment of the present disclosure.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification data protection 96. A program implementing the method, computer system, and computer program product (FIG. 1) may be offered "as a service in the cloud" (i.e., Software as a Service (SaaS)) for applications running on computing devices 102 (FIG. 1) and may control the provision of a resource to the user of a computing device based on earlier meetings, where the provision of a resource to the user of a computing device is based on one or more computing devices that are used by another user participating (or present) in the meeting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for provisioning resources to a user during a meeting with another user, each user having an associated computing device, wherein the method comprises:

detecting a meeting of a first user with a second user, wherein detecting the meeting comprises detecting a presence of a first computing device associated with a first user within a vicinity of a second computing device associated with a second user, and wherein the vicinity is determined based on a predefined range of distance between the first computing device and the second computing device;

based on the detection of the first computing device within a vicinity of the second device, obtaining historical data relating to previous activity performed on at least one of the first computing device and the second computing device, wherein the previous activity comprises a usage pattern associated with at least one of the first computing device and the second computing device and resources previously accessed on at least one of the first computing device and the second computing device during one or more previous detections of the first computing device within the vicinity of the second device; and during the meeting, provisioning one or more resources to at least one of the first computing device and the second computing device based on the usage pattern and the resources previously accessed on at least one of the first computing device and the second computing device.

2. The method of claim 1, wherein the resource is selected from a group comprising at least one of a notification, an application, an audio file, an address of a resource, and an electronic data file.

3. The method of claim 1, further comprising:
detecting an activity of at least one of the first and second users in response to the provision of the resource; and
updating the historical data based on the detected activity.

4. The method of claim 1, wherein the historical data relating to a user is selected from a group comprising at least one of an event occurrence, a source device, an executed application, an accessed data file, a location of the user, nearby users, a deployed communication link, an accessed resource address, a scheduled meeting; and invited users.

5. The method of claim 1, further comprising:
communicating the provisioning of the resource to at least one of the first and second computing devices; and
controlling at least one of the first and second devices to which the provisioning was communicated to provide the resource to the first and second users.

6. The method of claim 1, wherein each of the first and second computing devices is selected from a group comprising at least one of a smartphone, a smartwatch, a tablet computer, a laptop computer, and a desktop computer.

7. The method of claim 1, wherein obtaining historical data comprises:
accessing a database of historical data; and
extracting historical data for both of the first and second users associated with the one or more earlier meetings between the first and second users.

8. The method of claim 1, wherein each of the first and second computing devices comprises a communication interface arranged to communicate information via an associated communication link, and wherein the method further comprises:
communicating the provisioning to at least one of the first and second computing devices via its associated communication link.

9. A computer program product for provisioning resources to a user during a meeting with another user, each user having an associated computing device, comprising:
one or more tangible computer-readable storage devices and program instructions stored on at least one of the one or more tangible computer-readable storage devices, the program instructions executable by a processor, the program instructions comprising:

detecting a meeting of a first user with a second user, wherein detecting the meeting comprises detecting a presence of a first computing device associated with a first user within a vicinity of a second computing device associated with a second user, and wherein the vicinity is determined based on a predefined range of distance between the first computing device and the second computing device;

based on the detection of the first computing device within a vicinity of the second device, obtaining historical data relating to previous activity performed on at least one of the first computing device and the second computing device, wherein the previous activity comprises a usage pattern associated with at least one of the first computing device and the second computing device and resources previously accessed on at least one of the first computing device and the second computing device during one or more previous detections of the first computing device within the vicinity of the second device; and during the meeting, generating a control signal based on the obtained historical data, the control signal being configured to control the provisioning of a resource to at least one of the first computing device and the second computing device based the resource previously accessed on at least one of the first computing device and the second computing device.

10. The computer program product of claim 9, further comprising:
communicating the provisioning of the resource to at least one of the first and second computing devices; and
controlling at least one of the first and second devices to which the provisioning was communicated to provide the resource to the first and second users.

11. A system for provisioning resources to a user during a meeting with another user, each user having an associated computing device, wherein the system comprises:
detecting a meeting of a first user with a second user, wherein detecting the meeting comprises detecting a presence of a first computing device associated with a first user within a vicinity of a second computing device associated with a second user, and wherein the vicinity is determined based on a predefined range of distance between the first computing device and the second computing device;

based on the detection of the first computing device within a vicinity of the second device, obtaining historical data relating to previous activity performed on at least one of the first computing device and the second computing device, wherein the previous activity comprises a usage pattern associated with at least one of the first computing device and the second computing device and resources previously accessed on at least one of the first computing device and the second computing device during one or more previous detections of the first computing device within the vicinity of the second device; and during the meeting, provisioning one or more resources to at least one of the first computing device and the second computing device based on the usage pattern and the resources previously accessed on at least one of the first computing device and the second computing device.

12. The system of claim 11, further comprising:

detecting an activity of at least one of the first and second users in response to the provision of the resource; and updating the historical data based on the detected activity.

13. The system of claim 11, further comprising:

communicating the provisioning of the resource to at least one of the first and second computing devices; and controlling at least one of the first and second devices to which the provisioning was communicated to provide the resource to the first and second users.

14. The system of claim 11, wherein each of the first and second computing devices is selected from a group comprising at least one of a smartphone, a smartwatch, a tablet computer, a laptop computer, and a desktop computer.

15. The system of claim 11, wherein obtaining historical data comprises:

accessing a database of historical data; and extracting historical data for both of the first and second users associated with the one or more earlier meetings between the first and second users.

16. The system of claim 11, wherein each of the first and second computing devices comprises a communication interface arranged to communicate information via an associated communication link, and wherein the system further comprises:

communicating the provisioning to at least one of the first and second computing devices via its associated communication link.

17. The system of claim 11, wherein the historical data relating to a user is selected from a group comprising at least one of an event occurrence, a source device, an executed application, an accessed data file, a location of the user, nearby users, a deployed communication link, an accessed resource address, a scheduled meeting; and invited users.

\* \* \* \* \*